US008175885B2

(12) United States Patent
Sureka et al.

(10) Patent No.: US 8,175,885 B2
(45) Date of Patent: May 8, 2012

(54) CONTROLLING A SET-TOP BOX VIA REMOTE SPEECH RECOGNITION (75) Inventors: Ashutosh K. Sureka, Irving, TX (US);
Sathish K. Subramanian, Adyar (IN);
Sidhartha Basu, Kolkata (IN); Indivar Verma, Ambala (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1323 days.

(21) Appl. No.: 11/781,628

(22) Filed: Jul. 23, 2007

(65) Prior Publication Data
US 2009/0030681 A1 Jan. 29, 2009

(51) Int. Cl.
*G10L 15/22* (2006.01)

(52) U.S. Cl. ............ 704/270.1; 704/251; 704/275

(58) Field of Classification Search ........ 704/235, 704/251, 255, 257, 270, 270.1, 275
See application file for complete search history.

(56) References Cited

U.S. PATENT DOCUMENTS

| | | | | |
|---|---|---|---|---|
| 5,774,859 A * | 6/1998 | Houser et al. | ......... | 704/275 |
| 6,314,398 B1 * | 11/2001 | Junqua et al. | ......... | 704/257 |
| 6,408,272 B1 * | 6/2002 | White et al. | ......... | 704/270.1 |
| 6,523,061 B1 * | 2/2003 | Halverson et al. | ......... | 709/202 |
| 6,643,620 B1 * | 11/2003 | Contolini et al. | ......... | 704/270 |
| 7,260,538 B2 * | 8/2007 | Calderone et al. | ......... | 704/275 |
| 7,499,704 B1 * | 3/2009 | Bonner | ......... | 455/435.1 |
| 7,836,147 B2 * | 11/2010 | Reding et al. | ......... | 709/217 |
| 7,912,963 B2 * | 3/2011 | Jackson | ......... | 709/227 |
| 2002/0019732 A1 * | 2/2002 | Kikinis et al. | ......... | 704/201 |
| 2002/0194327 A1 * | 12/2002 | DeGilio et al. | ......... | 709/224 |
| 2003/0061039 A1 | 3/2003 | Levin | | |
| 2003/0078784 A1 * | 4/2003 | Jordan et al. | ......... | 704/275 |
| 2003/0088421 A1 * | 5/2003 | Maes et al. | ......... | 704/270.1 |
| 2003/0167171 A1 | 9/2003 | Calderone et al. | | |
| 2004/0064839 A1 * | 4/2004 | Watkins | ......... | 725/131 |
| 2004/0193426 A1 * | 9/2004 | Maddux et al. | ......... | 704/275 |
| 2005/0043948 A1 | 2/2005 | Kashihara | | |
| 2005/0114141 A1 * | 5/2005 | Grody | ......... | 704/270 |
| 2006/0028337 A1 | 2/2006 | Li | | |
| 2006/0095575 A1 * | 5/2006 | Sureka et al. | ......... | 709/227 |
| 2007/0010266 A1 * | 1/2007 | Chaudhuri | ......... | 455/466 |
| 2007/0038720 A1 * | 2/2007 | Reding et al. | ......... | 709/217 |
| 2007/0061149 A1 * | 3/2007 | Chang | ......... | 704/275 |
| 2007/0112571 A1 * | 5/2007 | Thirugnana | ......... | 704/270 |
| 2007/0150902 A1 * | 6/2007 | Meyer et al. | ......... | 719/313 |
| 2007/0250316 A1 * | 10/2007 | Ramaswamy et al. | ......... | 704/235 |
| 2007/0281682 A1 * | 12/2007 | Raju et al. | ......... | 455/422.1 |
| 2007/0286360 A1 * | 12/2007 | Chu et al. | ......... | 379/88.01 |
| 2008/0085728 A1 * | 4/2008 | Reding et al. | ......... | 455/466 |
| 2008/0155029 A1 * | 6/2008 | Helbling et al. | ......... | 709/206 |
| 2008/0208589 A1 * | 8/2008 | Cross et al. | ......... | 704/275 |

FOREIGN PATENT DOCUMENTS

| | | |
|---|---|---|
| DE | 10340580 | 3/2005 |
| JP | 2006-251545 | 9/2006 |

* cited by examiner

*Primary Examiner* — Martin Lerner (57) ABSTRACT

A device may receive over a network a digitized speech signal from a remote control that accepts speech. In addition, the device may convert the digitized speech signal into text, use the text to obtain command information applicable to a set-top box, and send the command information to the set-top box to control presentation of multimedia content on a television in accordance with the command information.

15 Claims, 7 Drawing Sheets

CONTROLLING A SET-TOP BOX VIA REMOTE SPEECH RECOGNITION

BACKGROUND INFORMATION

Set-top boxes (STBs) can be controlled through a remote control. The remote control may allow a user to navigate a program guide, select channels or programs for viewing, adjust display characteristics, and/or perform other interactive functions related to viewing multimedia-type content provided over a network. Typically, a user interacts with the STB using a keypad that is part of the remote control, and signals representing key depressions are transmitted to the STB via an infrared transmission.

DETAILED DESCRIPTION OF PREFERRED EMBODIMENTS

The following detailed description refers to the accompanying drawings. The same reference numbers in different drawings may identify the same or similar elements.

A preferred remote control may allow a user to issue voice commands to control a set-top box (STB). A user may speak commands for a STB into a microphone of the remote control. The remote control may send the spoken audio signal to a voice application facility, which may apply speech recognition to the audio signal to identify text information in the audio signal. The text information may be used to obtain command information that may be sent to the STB. The STB may execute the command information and cause a television connected to the STB to display certain media or other information.

As used herein, the term "audio dialog" may refer to an exchange of audio information between two entities. The term "audio dialog document," as used herein, may refer to a document which describes how an entity may respond with audio, text, or visual information upon receiving audio information. Depending on context, "audio dialog" may refer to an "audio dialog document."

The term "form," as used herein, may refer to an audio dialog document portion that specifies what information may be presented to a client and how audio information may be collected from the client.

The term "command information," as used herein, may refer to information that is derived by using the result of applying speech recognition to an audio signal (e.g., voice command). For example, if the word "Rome" is identified via speech recognition and "Rome" is used as a key to search a television program database, the search result may be considered "command information."

As used herein, "set top box" or "STB" may refers to any media processing system that may receive multimedia content over a network and provide such multimedia content to an attached television.

As used herein, "television" may refer to any device that can receive and display multimedia content for perception by users, and includes technologies such as CRT displays, LCDs, LED displays, plasma displays and any attendant audio generation facilities.

As used herein, "television programs" may refer to any multimedia content that may be provided to an STB.

Figure 1:
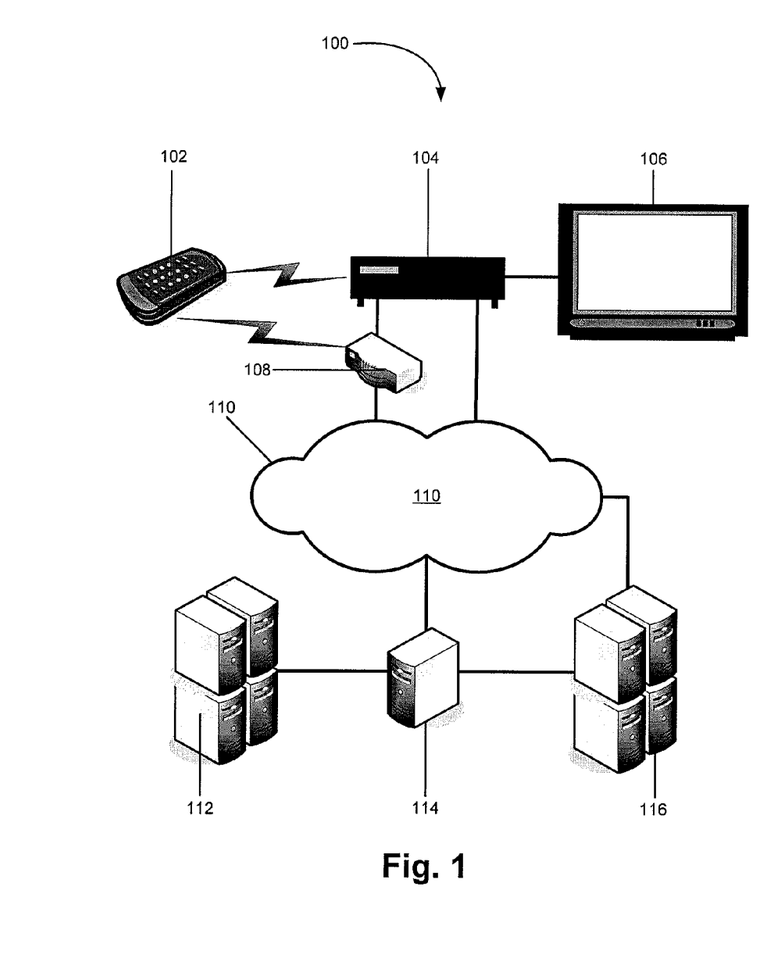
FIG. 1 shows an exemplary system in which concepts described herein may be implemented.

FIG. 1 shows an exemplary environment in which concepts described herein may be implemented. As shown, system 100 may include a remote control 102, a STB 104, a television 106, a customer router 108, a network 110, a server device 112, a voice application facility 114, and content provider device 116. In other implementations, system 100 may include more, fewer, or different components. For example, system 100 may include many set-top boxes, remote controls, televisions, customer routers, and/or voice application facilities and exclude server device 112. Moreover, one or more components of system 100 may perform one or more functions of another component of system 100. For example, STB 104 may incorporate the functionalities of customer router 108.

Remote control 102 may include a device for issuing wireless commands to and for controlling electronic devices (e.g., a television, a set-top box, a stereo system, a digital video disc (DVD) player, etc.). Some commands may take the form of digitized speech that is sent to server device 112 through STB 104 or customer router 108.

STB 104 may include a device for receiving commands from remote control 102 and for selecting and/or obtaining content that may be shown or played on television 106 in accordance with the commands. The content may be obtained from content provider device 116 via network 110 and/or customer router 108. In some implementations, STB 104 may receive digitized speech from remote control 102 over a wireless communication channel (e.g., Wireless Fidelity (Wi-Fi) channel) and relay the digitized speech to server device 112 over network 110. Television 106 may include a device for playing broadcast television signals and/or signals from STB 104.

Customer router 108 may include a device for buffering and forwarding data packets toward destinations. In FIG. 1, customer router 108 may receive data packets from remote control 102 over a wireless communication channel (e.g., a Wi-Fi network) and/or from STB 104 and route them to server device 112 or voice application facility 114, one or more devices in content provider device 116, and/or other destinations in network 110 (e.g., a web server). In addition, customer router 108 may route data packets that are received from server device 112 or voice application facility 114, content provider device 116, and/or other device devices in network 110 to STB 104. In some implementations, customer router 108 may be replaced with a different device, such as a Network Interface Module (NIM), a Broadband Home Router (BHR), an Optical Network Terminal (ONT), etc.

Network 110 may include one or more nodes interconnected by communication paths or links. For example, network 110 may include any network characterized by the type of link (e.g., a wireless link), by access (e.g., a private network, a public network, etc.), by spatial distance (e.g., a wide-area network (WAN)), by protocol (e.g. a Transmission Control Protocol (TCP)/Internet Protocol (IP) network), by connection (e.g., a switched network), etc. If server device 112, voice application facility 114, and/or content provider device 116 are part of a corporate network or an intranet, network 110 may include portions of the intranet (e.g., demilitarized zone (DMZ)).

Server device 112 may include one or more computer systems for hosting server programs, applications, and/or data related to speech recognition. In one implementation, server device 112 may supply audio dialog documents that specify speech grammar (e.g., information that identifies different words or phrases that a user might say) to voice application facility 114.

Voice application facility 114 may include one or more computer systems for applying speech recognition, using the result of the speech recognition to obtain command information, and sending the command information to STB 104. In performing the speech recognition, voice application facility 114 may obtain a speech grammar from server device 112, apply the speech grammar to an audio signal received from remote control 102 to identify text information, use the text information to obtain command information, and send the command information to STB 104 via content provider device 116. In some embodiments, voice application facility 114 and server device 112 may be combined in a single device.

Content provider device 116 may include one or more devices for providing content/information to STB 104 and/or television 106 in accordance with commands that are issued from STB 104. Examples of content provider device 116 may include a headend device that provides broadcast television programs, a video-on-demand device that provides television programs upon request, and a program guide information server that provides information related to television programs available to STB 104.

Figure 2:
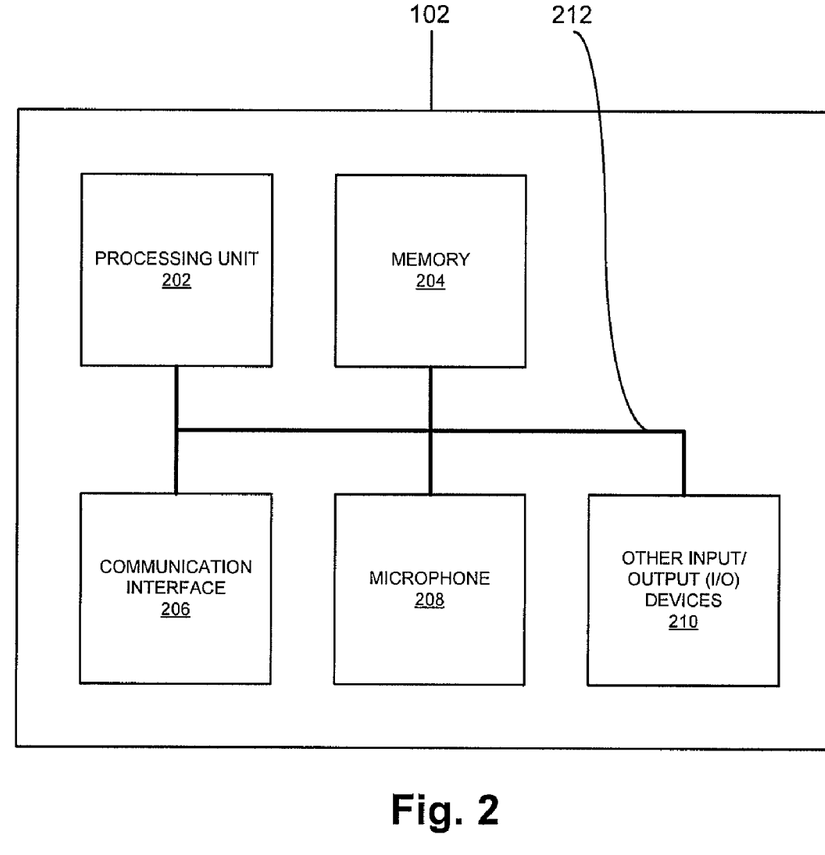
FIG. 2 is a block diagram of an exemplary remote control of FIG. 1.

FIG. 2 is a block diagram of an exemplary remote control 102. As shown, remote control 102 may include a processing unit 202, memory 204, communication interface 206, a microphone 208, other input/output (I/O) devices 210, and/or a bus 212. Depending on implementation, remote control 102 may include additional, fewer, or different components than the ones illustrated in FIG. 2.

Processing unit 202 may include one or more processors, microprocessors, and/or processing logic capable of controlling remote control 102. In some implementations, processing unit 202 may include a unit for applying digital signal processing (DSP) to speech signals that are received from microphone 208. In other implementations, processing unit 202 may apply DSP to speech signals via execution of a DSP software application. Memory 204 may include static memory, such as read only memory (ROM), and/or dynamic memory, such as random access memory (RAM), or onboard cache, for storing data and machine-readable instructions. In some implementations, memory 204 may also include storage devices, such as a floppy disk, CD ROM, CD read/write (R/W) disk, and/or flash memory, as well as other types of storage devices.

Communication interface 206 may include any transceiver-like mechanism that enables remote control 102 to communicate with other devices and/or systems. For example, communication interface 206 may include mechanisms for communicating with STB 104 and/or television via a wireless signal (e.g., an infrared signal). In another example, communication interface 206 may include mechanisms for communicating with devices in a network (e.g., a Wi-Fi network, a Bluetooth-based network, etc.).

Microphone 208 may receive audible information from a user and relay the audible information in the form of an audio signal to other components of remote control 102. The other components may process the audio signal (e.g., digitize the signal, filter the signal, etc.). Other input/output devices 210 may include a keypad, a speaker, and/or other types of devices for converting physical events or phenomena to and/or from digital signals that pertain to remote control 102. Bus 212 may provide an interface through which components of remote control 102 can communicate with one another.

Figure 3:
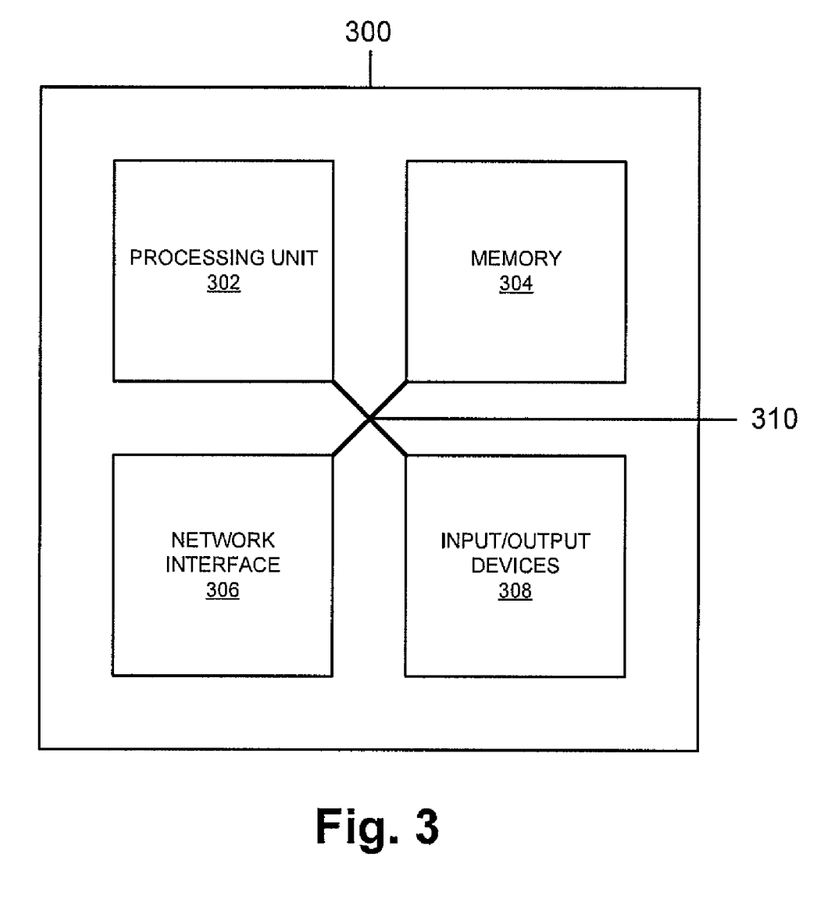
FIG. 3 is a block diagram of an exemplary server device of FIG. 1.

FIG. 3 is a block diagram of a device 300. Device 300 may represent STB 104, server device 112, voice application facility 114, and/or content provider device 116. As shown, device 300 may include a processing unit 302, memory 304, network interface 306, input/output devices 308, and bus 310. Depending on implementation, device 300 may include additional, fewer, or different components than the ones illustrated in FIG. 3. For example, if device 300 is implemented as STB 104, device 300 may include a digital signal processor for Motion Picture Experts Group (MPEG) decoding and voice processing. In another example, if device 300 is implemented as server device 112, device 300 may include specialized hardware for speech processing. In yet another example, if device 300 is implemented as content provider device 116, device 300 may include storage devices that can quickly process large quantities of data.

Processing unit 302 may include one or more processors, microprocessors, and/or processing logic capable of controlling device 300. In some implementations, processing unit 302 may include a specialized processor for applying digital speech recognition. In other implementations, processing unit 302 may synthesize speech signals based on XML data. In still other implementations, processing unit 302 may include an MPEG encoder/decoder. Memory 304 may include static memory, such as read only memory (ROM), and/or dynamic memory, such as random access memory (RAM), or onboard cache, for storing data and machine-readable instructions. In some implementations, memory 304 may also include storage devices, such as a floppy disk, CD ROM, CD read/write (R/W) disk, and/or flash memory, as well as other types of storage devices.

Network interface 306 may include any transceiver-like mechanism that enables device 300 to communicate with other devices and/or systems. For example, network interface 300 may include mechanisms for communicating with devices in a network (e.g., an optical network, a hybrid fiber-coaxial network, a terrestrial wireless network, a satellite-based network, a wireless local area network (WLAN), a Bluetooth-based network, a metropolitan area network, a local area network (LAN), etc.). In another example, network interface 306 may include radio frequency modulators/demodulators for receiving television signals.

Input/output devices 308 may include a keyboard, a speaker, a microphone, and/or other types of devices for converting physical events or phenomena to and/or from digital signals that pertain to device 300. For example, if device 300 is STB 104, input/output device 308 may include a video interface for selecting video source to be decoded or encoded, an audio interface for digitizing audio information, or a user interface. Bus 310 may provide an interface through which components of device 300 can communicate with one another.

Figure 4:
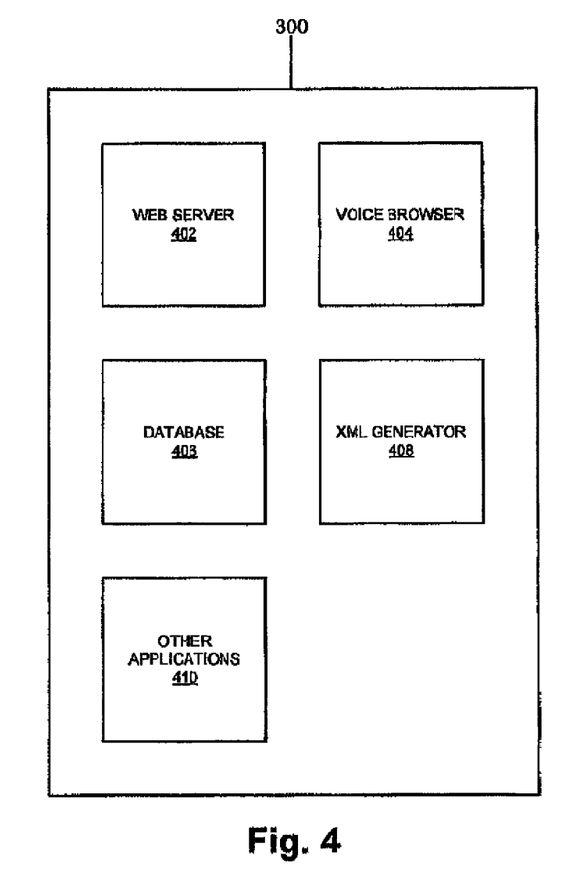
FIG. 4 is a functional block diagram of the exemplary server device of FIG. 1.

FIG. 4 is a functional block diagram of device 300. As shown, device 300 may include a web server 402, a voice browser 404, a database 406, a XML generator 408, and other applications 410. Depending on implementation, device 300 may include fewer, additional, or different types of components than those illustrated in FIG. 4. For example, if device 300 represents STB 104, device 300 may possibly exclude web server 402. In another example, if device 300 represents a voice application facility 114, device 300 may possibly exclude web server 402. In another example, if device 300 represents content provider device 116, device 300 may possibly include logic for communicating with STB 104.

Web server 402 may include hardware and/or software for receiving information from client applications such as a browser and for sending web resources to client applications. For example, web server 402 may send XML data to a voice browser that is hosted on voice application facility 114. In exchanging information with client devices and/or applications, web server 402 may operate in conjunction with other components, such as database 406 and/or other applications 410.

Voice browser 404 may include hardware and/or software for performing speech recognition on audio signals and/or speech synthesis. Voice browser 404 may use audio dialog documents that are generated from a set of words or phrases. In one implementation, voice browser 404 may apply speech recognition based on audio dialog documents that are generated from program guide information and may produce a voice response via a speech synthesis in accordance with the audio dialog documents. The audio dialog documents may include a speech grammar (e.g., information that identifies different words or phrases that a user might say and specifies how to interpret a valid expression) and information that specifies how to produce speech.

In some implementations, voice browser 404 may be replaced with a speech recognition system. Examples of a speech recognition system includes a dynamic type warping (DTW)-based speech recognition system, a neural network-based speech recognition system, Hidden Markov model (HMM) based speech recognition system, etc.

Database 406 may act as an information repository for other components of device 300. For example, web server 402 may retrieve and/or store web pages and information to/from database 406. In one implementation, database 406 may include program guide information and/or audio dialog documents. XML generator 408 may include hardware and/or software for generating the audio dialog documents in XML, based on the program guide information that is downloaded from content provider device 116 and stored in database 406. The audio dialog documents that are generated by XML generator 408 may be stored in database 406.

Other applications 410 may include hardware and/or software for supporting various functionalities of device 300, such as browser functions, MPEG encoding/decoding, a menu system for controlling a STB, application server functions, STB notification, text messaging, email, multimedia messaging, wireless communications, web access, file uploading and downloading, image transfer, etc.

Figure 5:
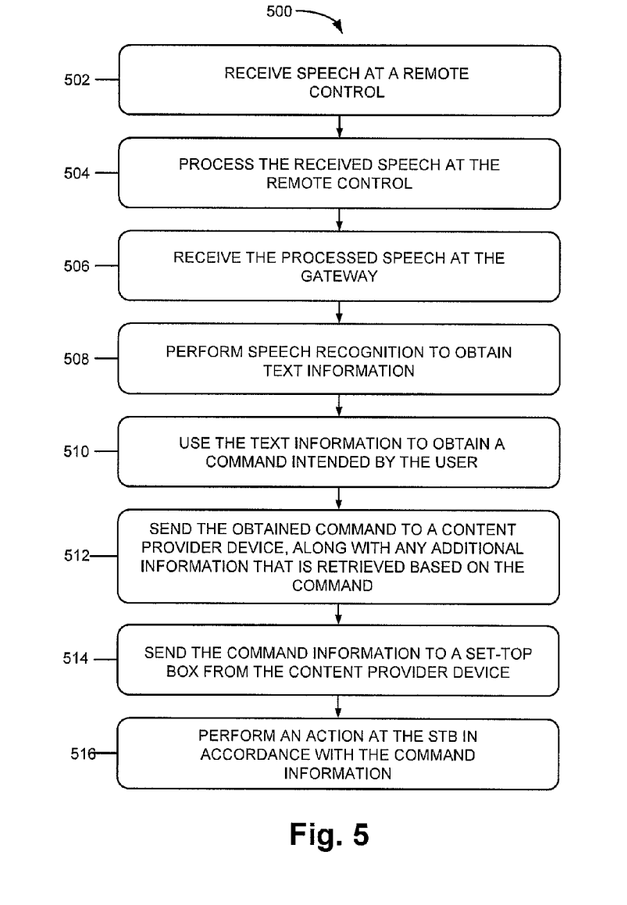
FIG. 5 is a flow chart of an exemplary process for controlling a set-top box via remote speech recognition.

The above paragraphs describe system elements that are related to devices and/or components for controlling a set-top box via remote speech recognition. FIG. 5 depicts an exemplary process 500 that is capable of being performed on one or more of these devices and/or components.

As shown in FIG. 5, process 500 may start at block 502, where speech may be received at remote control 102. The speech may include a request to play a television program, a video (e.g., a movie), or to perform a particular action on television 106. For example, a user may press a button on remote control 102 and utter "Go to channel 100." In another example, a user may request, "Increase volume."

The received speech may be processed at remote control 102 (block 504). If the speech is received through microphone 208, the speech may be digitized, processed (e.g., digitally filtered), and incorporated into network data (e.g., a packet). The processed speech may be sent to voice application facility 114 through STB 104 or customer router 108, using, for example, the Session Initiation Protocol (SIP).

The processed speech may be received at voice application facility 114 (block 506). In some implementations, voice application facility 114 may host voice browser 404 that supports SIP and/or voiceXML. In such cases, voice application facility 114 may accept messages from remote control 102 via voice browser 404 over SIP. For example, remote control 102 may use a network address and a port number of voice browser 404, which may be stored in memory 204 of remote control 102, to establish a session with voice browser 404. During the session, the processed speech and any additional information related to STB 104 may be transferred from remote control 102 to voice application facility 114. The session may be terminated after processed speech and the information are received at voice application facility 114.

At block 508, speech recognition may be performed to obtain text information. Performing the speech recognition may involve identifying the text information (e.g., words or phrases) in the processed speech using voice browser 404, which may apply a speech grammar specified in the audio dialog documents to the processed speech.

The audio dialog documents may be kept up-to-date by server device 112. For example, server device 112 may periodically download information (e.g., program guide information) from content provider device 116, generate audio dialog documents that specify speech grammar, forms, or menus based on the downloaded information via XML generator 408, and store the audio dialog documents in database 406. In many implementations, the audio dialog documents may be stored in XML (e.g., voiceXML).

The text information may be used to obtain a command intended by the user (block 510). For example, in one implementation, if the text information includes the name of a television show, voice browser 404 may interpret the text information as a command to retrieve the show's viewing data/time. In such instances, the text information may be used as a key to retrieve additional information that includes the show's schedule from database 406. In another example, if the text information includes a word related to changing a viewing channel, voice browser 404 may interpret the text information as a command that STB 104 may follow to change the viewing channel on television 106. In different implementations, a component other than voice browser 404 may be used to obtain the command.

The obtained command may be sent to content provider device 116, along with any additional information that is retrieved based on the command (e.g., a show's viewing schedule) (block 512). As used herein, the term "command information" may encompass both the command and the additional information.

The command information may be sent to STB 104 from content provider device 116 (block 514). In sending the command information from voice application facility 114 to content provider device 116 and from content provider 116 to STB 104, any suitable communication protocol may be used (e.g., hypertext transfer protocol (HTTP), file transfer protocol (FTP), etc.). Command information may be formatted such that STB 104 will recognize the communication as command information (e.g., using predetermined coding and/or communication channels/ports/formats).

Actions in accordance with the command information may be performed at STB 104 (block 516). For example, if the command information indicates a selection of a television program, STB 104 may momentarily display on television 106 a message that indicates a television program is being selected and STB 104 may cause television 106 to show the selected program. In yet another example, if the command information indicates that a volume of television 106 is to be changed, STB 104 may momentarily display the magnitude of the increased volume on television 106.

Many changes to the components and the process for controlling a set-top box via remote speech recognition as described above may be implemented. For example, in different implementations, server device 112 and voice application facility 114 may be replaced by a single device. In such implementation, all components that are shown in FIG. 4 may be included in the single device.

Figure 6:
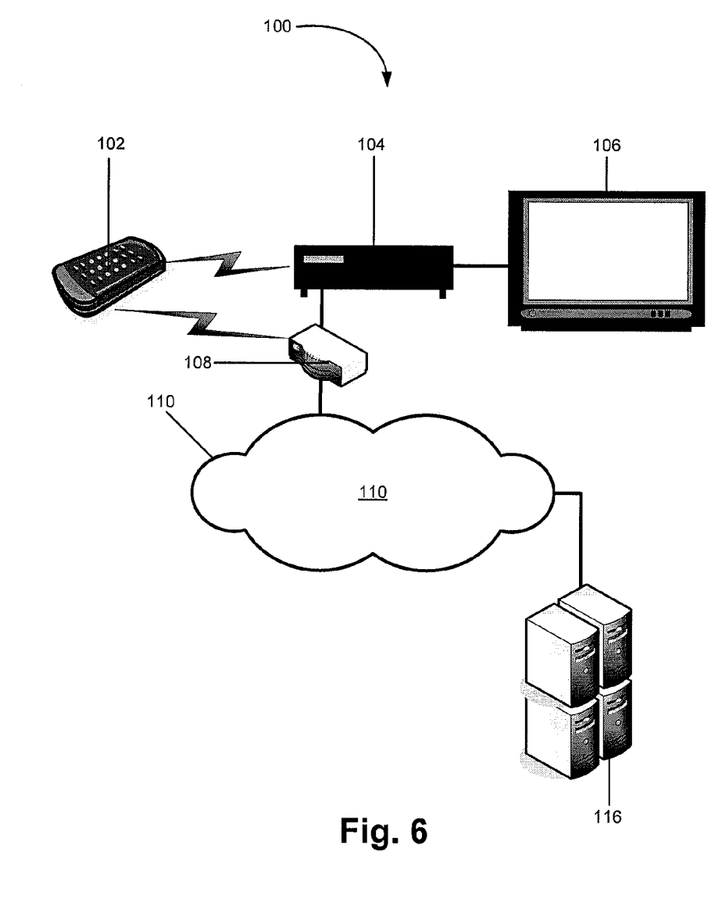
FIG. 6 shows another exemplary system in which the concepts described herein may be implemented.

FIG. 6 shows a diagram of another implementation of a speech recognition system. In the system shown in FIG. 6, database 406 and XML generator 408 may be hosted by STB 104. In the implementation, STB 104 may perform speech recognition and apply a speech grammar to a digitized audio signal that is received from remote control 102. The speech grammar may be produced by XML generator 408, based on program guide information that is periodically downloaded from content provider device 116.

In the system of FIG. 6, STB 104 may obtain text information from the digitized voice signal, obtain a command from the text information, and perform an action in accordance with the command. In such implementations, server device 112 may be excluded.

Figure 7:
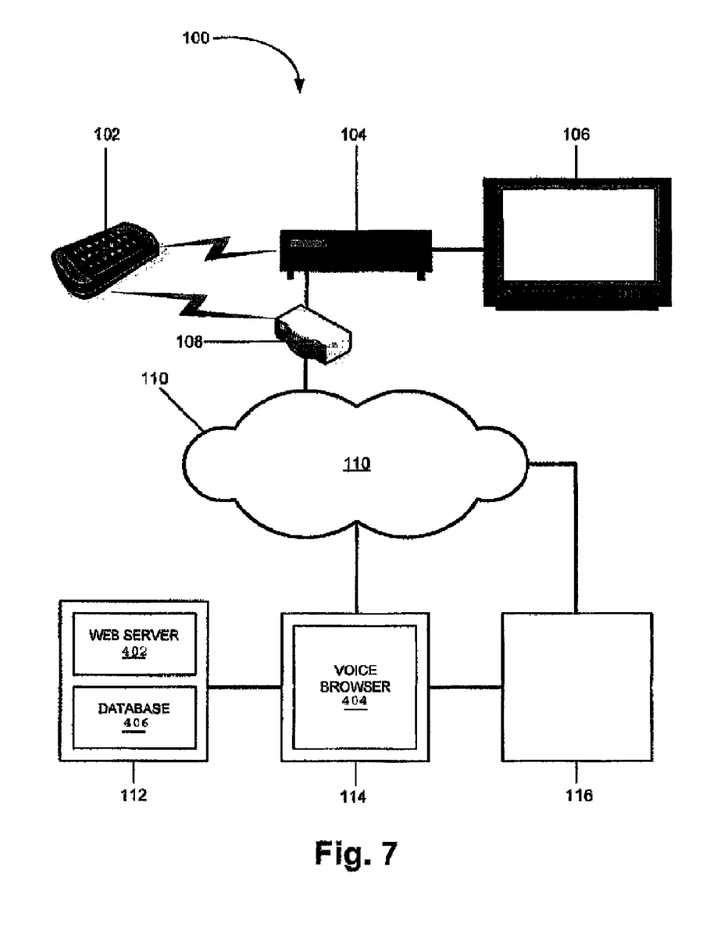
FIG. 7 is a diagram showing some of the components of FIG. 1 and FIG. 4.

The following example illustrates processes that may be involved in controlling a set-top box via remote speech recognition, with reference to FIG. 7. The example is consistent with the exemplary process described above with reference to FIG. 5.

As illustrated in FIG. 7, system 100 includes components that have been described with respect to FIG. 1 and FIG. 4. Assume for the sake of the example that server device 112 includes web server 402, database 406 and XML generator 408, that voice application facility 114 includes voice browser 404, and that remote control 102 communicates with customer router 108 via a Wi-Fi network. In addition, assume that voice application facility 114 has retrieved the program guide information for the next seven days from content provider device 116.

In the example, assume that a user speaks a command to remote control 102, intending to have a search performed to identify all instances of television shows which have the word "Sopranos" in the title. The user might indicate this desire by depressing a key on the remote control associated with voice commands and speaking a phrase such as "Find all Sopranos shows." The remote control may also have a key dedicated to search functionality, in which case the user might depress such a key and simply say "Sopranos." In any case, the remote control 102 digitizes the received voice audio to produce a digital audio signal. Remote control 102 establishes a SIP session with voice application facility 114 and transmits the digital audio signal over the Wi-Fi network via customer router 108. Voice browser 404 that is hosted on voice application facility 114 performs speech recognition on the received audio signal, by using a speech grammar that is part of audio dialog documents stored in database 406. To perform the speech processing, voice browser 404 may request that web server 402 provide the audio dialog documents. The speech grammar may be based on the program guide information provided by the content provider device 116, which may allow for better speech recognition results due to the limitation of the grammars to just text that appears in the program guide information. In the current example, the voice browser may find that the received speech most closely matches the grammar associated with the text "Sopranos."

Upon identifying the word "Sopranos" as the most likely matching text, voice application facility 114 may send this resulting text to content provider device 116 over HTTP. In turn, content provider device 116 may send the resulting text to STB 104 over HTTP, and may further include indications for the STB to perform a search of the program guide information to identify a matching set of program guide entries. Upon receiving this command information, STB 104 may interpret the command information to determine that a search has been requested using the resulting text, and cause the search to be performed using the resulting text. The STB may further provide a display indicating that a search has been requested, the resulting text that is being searched, and possibly an indication that the command was received through the voice interface. The search results may then be displayed by STB 104 on television 106 according to the manner in which STB displays such search results.

In some embodiments, the program guide search described above may instead be performed by voice application facility 114 and provided to content provider 116, or be performed by content provider device 116 in response to receiving the resulting text. In some cases this may be preferable, as it reduces the processing obligations of STB 104. In such cases, the results of the program guide search would be communicated to STB 104—for example, as indications of program guide entries that are within the results (possibly with an indication of order of display)—which would then cause a display of the search results on television 106 similar to that described above.

The above example illustrates how a set-top box may be controlled via remote speech recognition. A remote control that can receive and forward speech to speech processing facilities may facilitate issuing voice commands to control a STB. In the above implementation, to control the STB, the user may speak commands for the STB into a microphone of the remote control. The remote control may convert the commands into audio signals and may send the audio signals to a voice application facility. Upon receiving the audio signals, the voice application facility may apply speech recognition. By using the result of applying the speech recognition, the voice application facility may obtain command information for the STB. The command information may be routed to the STB, which may display and/or execute the command information.

The foregoing description of implementations provides an illustration, but is not intended to be exhaustive or to limit the implementations to the precise form disclosed. Modifications and variations are possible in light of the above teachings or may be acquired from practice of the teachings.

For example, while a series of blocks have been described with regard to the process illustrated in FIG. 5, the order of the blocks may be modified in other implementations. In addition, non-dependent blocks may represent blocks that can be performed in parallel. Further, certain blocks may be omitted. For example, in the implementation in which STB 104 performs speech recognition, blocks 512 and 514 may be omitted.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, an application specific integrated circuit, or a field programmable gate array, software, or a combination of hardware and software.

No element, block, or instruction used in the present application should be construed as critical or essential to the implementations described herein unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   retrieving, from a content provider, first program guide information related to prospective programming of multimedia content;
   storing, in a database, a speech grammar generated from the first program guide information;
   receiving, over a network, a digitized speech signal corresponding to a spoken command received via a voice interface of a remote control associated with a television, wherein receiving the digitized speech signal includes:
      establishing, via a customer router, a Session Initiation Protocol SIP session with the remote control and
      receiving, over the network via the SIP session, the digitized speech signal from the remote control over a wireless fidelity (Wi-Fi) network via the customer router;
   converting the digitized speech signal into text, using speech recognition;
   identifying one or more terms in the text that most closely match the stored speech grammar;
   generating command information, applicable to a set-top box associated with the television, for performing a search using the identified one or more terms, of second program guide information related to scheduled programming of the multimedia content; and
   sending the command information to the set-top box, wherein the set-top box is configured to control presentation of the multimedia content, based on the scheduled programming, via the television, in accordance with results of the search.

2. The method of claim 1, wherein sending the command information to the set-top box includes:
   sending the command information based on the information related to the set-top box.

3. The method of claim 1, wherein converting the digitized speech signal into text includes:
   retrieving, from the database, an extensible markup language document that identifies the speech grammar; and
   performing the speech recognition on the digitized speech signal based on the identified speech grammar.

4. The method of claim 1, further comprising:
   generating the speech grammar based on:
      the information related to the set-top box.

5. The method of claim 1, further comprising:
   selecting a number of program guide entries from the second program guide information based on the results of the search, and
   displaying, in a manner determined by the set-top box, the selected program guide entries via the television.

6. The method of claim 1, wherein the set-top box is further configured to display information indicating that at least one of:
   the search has been requested,
   the search is in progress,
   the search corresponds to the spoken command.

7. A device comprising:
   a speech processing application, configured to:
      periodically download future program guide information associated with a content provider;
      associate a particular speech grammar with the future program guide information;
      receive, via a. network, a. digitized speech signal corresponding to a spoken command received via a voice interface of a remote control associated with a television;
      use speech recognition to convert the digitized speech signal into text;
      identify one or more terms, in the text, that most closely match the particular speech grammar;
      generate command information based on results of a search of program guide information, associated with a set-top box, using the one or more terms in a search query; and
      cause the set-top box to control presentation of multimedia content provided by the content provider, via the television, in accordance with the command information: and
   a voice application facility configured to:
      establish, via a customer router, a Session initiation Protocol (SIP) session with the remote control, and
      receive, over the network via the SIP session, the digitized speech signal from the remote control over a wireless fidelity (Wi-Fi) network via the customer router.

8. The device of claim 7, wherein the speech recognition application is further configured to:
   receive a document, identifying the particular speech grammar from a server device, wherein the speech processing application is further configured to use the document to perform the speech recognition.

9. The device of claim 8, wherein the document includes:
   an extensible markup language (XML) document.

10. The device of claim 7, wherein the speech recognition application includes:
    a voice browser.

11. The device of claim 7, further comprising:
    a database that stores documents that specify the particular speech grammar as a speech grammar to be used to perform the speech recognition.

12. The device of claim 11, wherein the speech recognition application is further configured to:
    download the future program from the content provider;
    generate the particular speech grammar based on the future program schedules prior to receiving the digitized speech signal; and
    store the particular speech grammar in the database.

13. The device of claim 7, wherein the command information includes:
    information for displaying the results of the search in a manner determined by the set-top box.

14. The device of claim 7, wherein the command information includes:
    an order for displaying the results of the search.

15. The device of claim 7, wherein the command information includes at least one of:
    an instruction for the set-top box to show selected content, of the multimedia content, at the television; or
    an instruction for the set-top box to control audio or visual properties associated with the television.

* * * * *